PHONOGRAPH RECORD CENTERING AND DRIVING MEANS

Filed June 30, 1949 2 SHEETS—SHEET 1

INVENTOR.
GILBERT J. KENNEDY
BY
Brown, Denk & Synnestvedt
AGENTS

Nov. 25, 1952 G. J. KENNEDY 2,619,351

PHONOGRAPH RECORD CENTERING AND DRIVING MEANS

Filed June 30, 1949 2 SHEETS—SHEET 2

INVENTOR.
GILBERT J. KENNEDY
BY
Brown, Denk & Synnestvedt
AGENTS

Patented Nov. 25, 1952 2,619,351

UNITED STATES PATENT OFFICE 2,619,351

PHONOGRAPH RECORD CENTERING AND DRIVING MEANS

Gilbert J. Kennedy, Philadelphia, Pa., assignor to Philco Corporation, Philadelphia, Pa., a corporation of Pennsylvania Application June 30, 1949, Serial No. 102,208

3 Claims. (Cl. 274—10)

The present invention relates to means for centering and driving phonograph records and, particularly, to means adapted to establish driving engagement between a phonograph turntable and disc-shaped records placed thereon. More specifically, the invention has to do with an improved arrangement whereby the records are effectively held against slippage when supported on the turntable of phonographs of the automatic type in which a stack of records is suspended above the turntable, and the records are successively dropped, one onto the other, upon the turntable.

As is well known, present day conventional records for home use are provided with a center opening having a standardized diameter of approximately 0.286 inch, and the phonograph turntable, on which such records are played, is provided with a centering spindle of a standard size to fit within the record center opening of the mentioned diameter. In practice, standard spindles have a standardized diameter of approximately 0.277 inch. It is also known that, because records of the mentioned conventional kind are generally flat and of substantially uniform thickness throughout, the entire surfaces of superposed records supported on the turntable contact each other, so that the records tend to become stabilized on the turntable and thus, slippage between the records has not, heretofore, been a serious problem.

However, unconventional records having a center opening of approximately 1.504 inches have been recently introduced on the market and, clearly, these records will not be centered and, therefore, cannot be properly played on a phonograph turntable having the standard size spindle. Moreover, in these unconventional records, an unrecorded portion which surrounds the center opening, is much thicker than the thickness of the recorded portion which surrounds said thicker portion. Due to this difference in thickness, the records are apt to tilt about the outer edges of the thicker portion when the needle pressure is applied to the recorded thinner portion and, thus, a condition arises in which slippage is apt to occur during playing. It is also of importance that the said unconventional records are usually very light in weight, as compared with records of uniform thickness, and this lightness increases the possibility of slippage between the records because of the consequent reduction in the pressure between the adjacent record surfaces.

In order that these unconventional records may be properly centered on a turntable having a spindle of standard size, it has been proposed to use adapters or inserts which are designed to occupy the larger center opening and which are provided with a centralized aperture corresponding to the size of the center opening of conventional records. The use of these adapters and inserts, however, does not solve the above stated slippage problem and, in an effort to cure the difficulty, it has been suggested to provide the opposite faces of the adapters or inserts with means, such as serrations or projections and recesses, which are intended to become drivingly interengaged when records are stacked on the turntable. It has been found that the provision of such means fails in its purpose, mainly because the aforementioned tilting action prevents the required interengagement. Moreover, tests have shown that the provision of such means is objectionable in that it interferes with the desired operation of the so-called "push off" mechanism which is incorporated in automatic phonographs of the record dropping type, because such means are likely to interlock the records and, thus, interfere with the proper discharge of the lowermost record from the suspended stack.

It is, therefore, the primary object of this invention to make possible the adequate centering and playing of the mentioned unconventional records on phonographs which are primarily designed to accommodate records of conventional type, and to overcome the above stated objections and difficulties to which the proposals heretofore made for that purpose, are subject.

It is also an object of the invention to provide an arrangement which, in order to prevent slippage of a record being played, is capable of assuring adequate interlocking between the turntable and the records received thereon, but which, in order not to interfere with the proper discharge of the lowermost record, does not and cannot interlock the records held in suspended position above the turntable.

Another and more specific object of the invention resides in associating means with the turntable and with the records to be successively played thereon, in such a manner that each record, as it falls in playing position, is effectively locked to the turntable to be positively driven thereby.

Briefly stated, the arrangement which this invention provides to realize the above stated general objects, comprises complementay interlocking means, one of said means being provided on the records and the other of said means being mounted on the turntable to rotate therewith. The means provided on the records includes a center opening which is adapted for slidable engagement with the centering standard spindle on the turntable, and also includes an apertured portion which is offset or eccentrically disposed with respect to said opening. In accordance with a specific feature of the invention, the above stated center opening and offset apertured portion are provided in an adapter or insert for that type of records which have a center opening of a diameter much greater than the diameter of the standard centering spindle. The means mounted on the turntable includes an elongated element or finger adapted, when in use, to extend in a plane substantially paralleling the generally longitudinal axis of the centering spindle and located to the side of said spindle, so that said element or finger lies in a position which is offset or eccentric with respect to said spindle. The offset position of the finger with respect to the centering spindle substantially corresponds to the offset position of the apertured portion with respect to the center opening in each record adapter or insert so that, as each record is dropped toward the turntable, said finger finds and enters one of said apertured portions and, thereby, establishes a driving connection between the dropped record and the turntable. The finger may form part of a removable unit placeable in cooperative association with the turntable and centering spindle, or may form part of a structure movably affixed to the turntable so that the finger may be selectively placed in either an operative position in which the finger extends at substantially right angles to the turntable, or an inoperative position in which the finger lies in the plane of the turntable.

The above stated objects and features of the invention, and the manner in which they are attained, will be more fully understood from the following detailed description based on the accompanying drawings in which.

Figure 1:
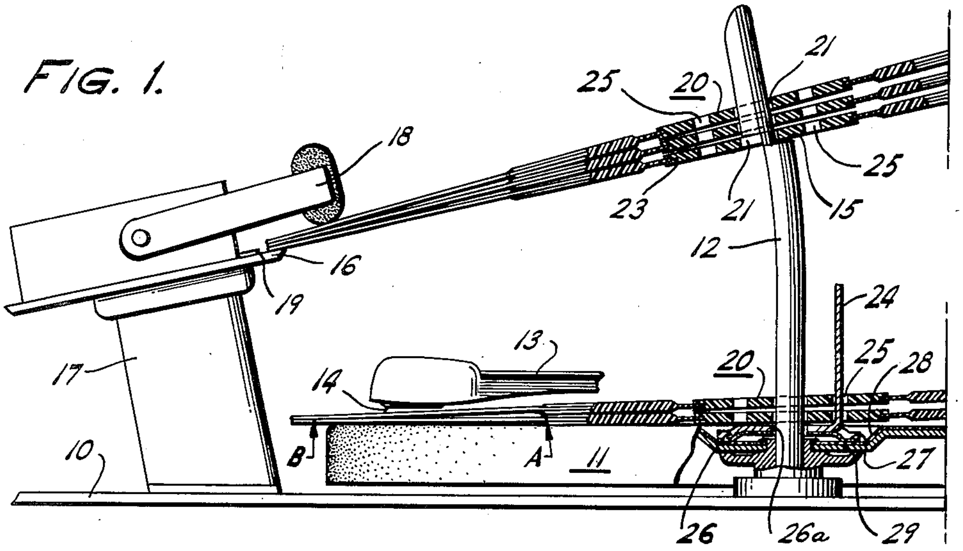
Figure 1 is an elevational-sectional view of a portion of a phonograph, and illustrates a practicable embodiment of the invention in use.

With more particular reference to the drawings, Figure 1 illustrates the essential parts of one form of phonograph to which the invention is applied. As shown, the phonograph includes a mounting panel 10 which serves to support the various parts. A turntable 11 is rotatably supported by the panel, and is adapted to hold the records during the playing thereof. A centering spindle 12 serves to center the records and to retain them on the turntable. A tone-arm, part of which is shown at 13, is arranged in the usual manner on the mounting panel to swing both vertically and horizontally with respect to the turntable, so that the customary pickup needle 14 may be brought into engagement with the modulated groove of a record placed in playing position over the turntable.

As previously mentioned, the phonograph is of the type in which a stack of records is held in suspended position above the turntable, and the records are fed successively to the turntable. To that end, the stack of records to be played is supported by means of a shoulder 15 provided on the centering spindle and by means of a shelf 16 arranged on a supporting structure 17 which is mounted on panel 10 to the side of the turntable. A pivoted holder 18 serves to maintain the records, firmly, in their suspended position on shoulder 15 and shelf 16. A record discharging mechanism, including a pusher 19, is associated with the shelf and functions to effect release of the lowermost record in the supported stack. The operation of the parts during a record changing cycle, is well known in the art and needs no explanation here.

Figure 2:
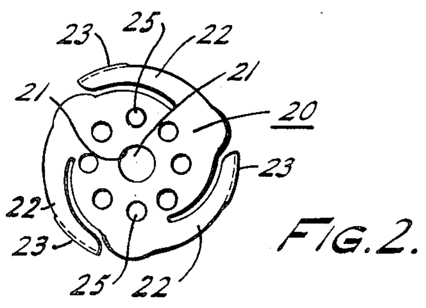
Figure 2 is a plan view of a convenient form of adapter or insert used with records which depart from standard construction.
Figures 4, 5:
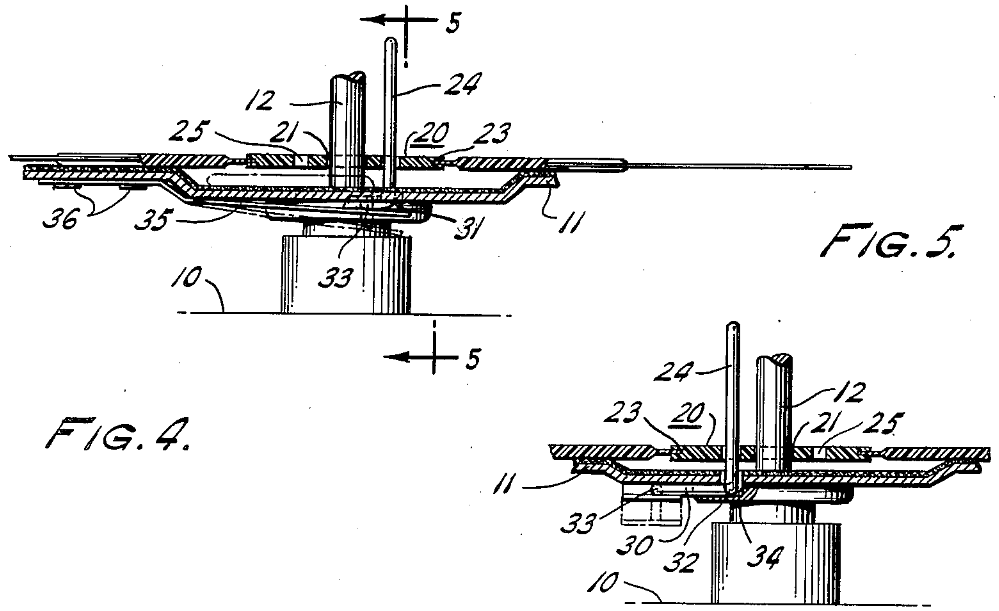
Figure 4 is a sectional-elevational view of a portion of a turntable structure, and shows another practicable embodiment of the invention.
Figure 5 is a sectional view looking in the general direction of arrows 5—5 of Figure 4.
Figure 6:
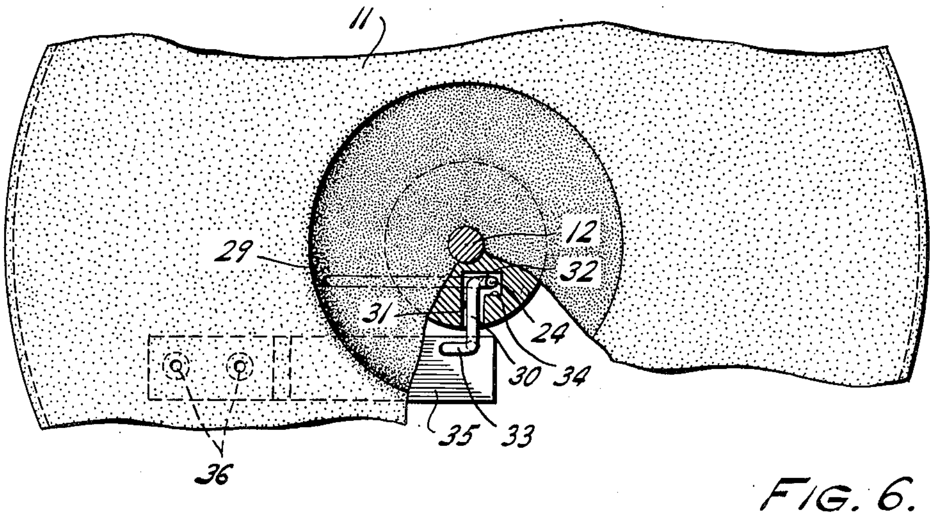
Figure 6 is a fragmentary plan view of the arrangement as shown in Figure 4, certain parts being broken away for clarity of illustration.

As also previously mentioned, in order that the records may be properly centered and played on a phonograph of the kind above described, the diameter of the centering spindle must come very close to the diameter of the center opening of the record discs. Therefore, it will be understood that such a standard spindle cannot be used with records provided with a center opening having a materially larger diameter, as is the case with the type of unconventional records which have lately been made available to the public. These unconventional records, however, may be used on standard equipment, including the above specified standard spindle, by providing each record with an adapter or insert as indicated, generally, at 20. An adapter or insert suitable for the purpose, is shown in Figure 2. This adapter or insert consists of a generally circular blank having a central opening 21 to fit over the standard spindle, that is, an opening having the same diameter as the center opening of a conventional record. The blank is provided with three generally circumferentially extending legs 22, each leg terminating with a grooved edge portion 23. In use, these edge portions pressingly engage the marginal edge of the center opening of the record to lock the adapter or insert in position.

Although the use of adapters or inserts of the general kind above described, allows for adequate centering of the unconventional type records on a turntable provided with a spindle of standard diameter, the proper reproduction of such records meets with more serious problems because, as hereinbefore indicated and as is illustrated in Figure 1, the central thicker portion of such records are apt to cause tilting of the record being played, when the pickup needle bears on the thinner recorded portion of said record. This tilting action, it will be understood, creates a condition in which main contact between superposed records, occurs at spaced points as is represented at A and B in Figure 1 and, accordingly, as the record being played rotates with the turntable, the drag of the pickup needle is apt to overcome the frictional resistance between the records and causes slippage. The result, of course, is faulty reproduction.

The present invention eliminates the difficulty by providing a positive driving connection between the turntable and the records received thereon. For that purpose, means in the form of an elongated rigid finger 24, which is adapted to extend upwardly from and to rotate with the turntable, is disposed at a point laterally offset with respect to the centering spindle 12; and means in the form of a series of apertures 25, is provided in the adapters or inserts affixed to the records. These apertures are disposed in a circle which is concentric with the centering opening 21 in the adapters or inserts, so that each of said apertures is located at a point laterally offset with respect to said center opening. Finger 24 and apertures 25 are so disposed that said finger which rotates with the turntable, will find and enter one of said apertures as the lowermost record, from the suspended stack, drops along the centering spindle toward playing position over the turntable. Due to the engagement between the finger and one of the apertures, all of the records supported on the turntable become fixed with respect to the latter and, thus are positively driven without having to depend on the existence of friction between the several records or between the turntable and the immediately adjoining record. In practice, the length of finger 24 is such that it exceeds the thickness of the full stack of records which the phonograph is designed to accommodate.

Figure 3:
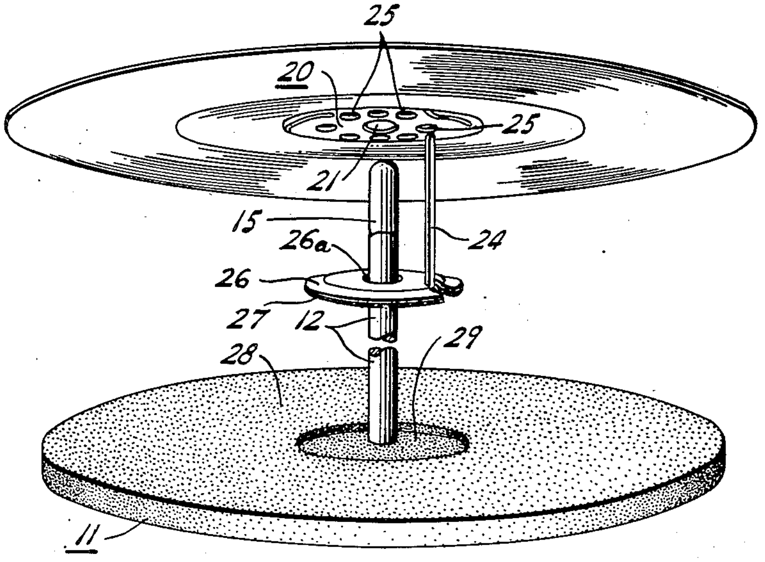
Figure 3 is an exploded view illustrating, in perspective, the main elements of the embodiment as shown in Figure 1.

In accordance with the invention, the rigid finger 24 may form part of a structure which, as shown in Figures 1 and 3, is adapted for removable engagement with the turntable; or the finger may form part of a structure which, as shown in Figures 4 through 7, is adapted to be permanently attached to the turntable and provides for movement of said finger to either an operative position or an inoperative position.

As shown in Figures 1 and 3, the finger 24 projects contiguously from a marginal edge portion of a base 26 and is bent to extend at a substantially right angle to said base 26, and this base and finger form an integral unit. The base is provided with a circular opening 26*a* whereby the unit may be slipped along the centering spindle 12 until it comes to rest on the turntable. The base is massive enough to provide for good adherence of the unit to the turntable, however, this adherence is further insured by applying, to the under face of the base, a layer of frictional material 27 similar to the layer of frictional material 28 which is usually applied to the upper face of the turntable. Preferably, the turntable is of the type which has a central depressed portion 29, and the base of the unit is of such a size as to fit within said portion, when said unit is in use. Of course, when the unit is not needed to prevent slippage, or when it is desired to play standard records, the user may readily remove the unit by lifting it off the turntable and sliding it out of engagement with the centering spindle.

In the embodiment shown in Figures 4 through 7, the finger 24 takes the form of an extension which projects from a crank-like member 30 hingedly connected with the turntable. The hinged connection is conveniently obtained by mounting the crank-like member in a generally horizontal slot 31 in a wall portion of the turntable hub, so that the finger, as is indicated in full lines, may be lifted to an operative generally vertical position at a substantially right angle with respect to the surface of the turntable or, as is indicated in broken lines, may be folded to an inoperative generally horizontal position in the general plane of the surface of the turntable.

Figure 7:
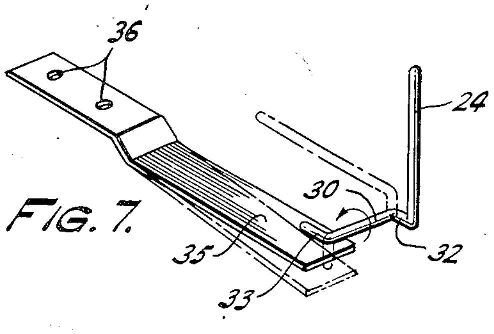
Figure 7 is an explanatory fragmentary view, in perspective, illustrating the operation of certain parts of the embodiment shown in Figures 4, 5 and 6.

The construction of the crank-like member and associated finger is clearly seen in Figure 7. As shown, the crank-like member includes two bent portions 32 and 33, and it is to be noted that, as appears more clearly in Figures 4 and 5, the crank-like member lies beneath the turntable, and one bent portion 32, from which finger 24 extends, fits in a recess 34 disposed in the turntable and its hub to allow the above described lifting and folding movements of said finger. It is also to be noted that, when the finger is in its folded or inoperative position, said one bent portion 32 of the crank member rises from said recess 34 but remains within the depressed portion 29 of the turntable, so that the finger, when in said inoperative position, does not protrude beyond the record supporting surface of the turntable. In this manner, the finger, when not used, does not interfere with the proper resting of the records on the turntable. Attention is called to the fact that the other bent portion 33 of the crank-like member is so disposed as to come in contact with a portion of the turntable structure, when the finger 24 is moved to its upright position. Thus, said portion 33 acts as a stop which advantageously serves to determine the proper operative position of said finger with respect to the centering spindle. Means in the form of a leaf spring 35 which is connected, as at 36, to the underside of the turntable and which bears on bent portion 33, serves releasably to lock the finger in either of its two positions.

From the foregoing description, it will be appreciated that the finger means associated with the turntable, and the apertured means associated with the records provide a combination of elements which effectively prevents record slippage and which secures positive driving, by the turntable, of the record being played, even when several records are stacked between the turntable and the record being played. Particularly, it will be appreciated that the invention provides a convenient arrangement whereby records of the conventional type having a center opening of standard diameter, as well as records of the herein described unconventional type provided with a center opening larger than standard diameter, may be adequately centered and played on a turntable provided with a centering spindle of standard size.

I claim:

1. In an arrangement for centering and driving a plurality of phonograph records successively dropped from a suspended stack to playing position upon a turntable provided with a central depressed portion and with a centering spindle having a diameter considerably smaller than the diameter of the center opening in each of said records, an insert for each record, each insert removably occupying the center opening of an associated record and having a centralized opening and eccentrically disposed apertures, the centralized opening having a diameter approximating the spindle diameter and slidably fitting over said spindle to center each record as it drops into playing position upon the turntable, and means arranged on the turntable to rotate therewith, said means consisting of a removable unit including a base and an elongated finger, said base being provided with an opening to receive said spindle and being configured to fit within said depressed portion of the turntable, said finger projecting contiguously from a marginal edge portion of said base and bent to extend substantially at right angles to the latter and having a length exceeding the full thickness of the stack of records and disposed eccentrically with respect to the opening in said base, the eccentric position of said finger corresponding to the eccentric position of the apertures in said inserts so that, as each record is dropped along the spindle and toward the turntable, said finger finds and engages one of said eccentrically disposed apertures in the insert of each record to drive the records conjointly as they stack up in playing position on the turntable.

2. The arrangement set forth in claim 1, in which the mentioned base is provided with a frictional surface portion to engage the turntable.

3. In an arrangement for centering and driving a plurality of phonograph records successively dropped from a suspended stack to playing position upon a turntable provided with a central depressed portion and with a centering spindle having a diameter considerably smaller than the diameter of the center opening in each of said records, an insert for each record, each insert removably occupying the center opening of an associated record and having a centralized opening and eccentrically disposed apertures, the centralized opening having a diameter approximating the spindle diameter and slidably fitting over said spindle to center each record as it drops into playing position upon the turntable, and means arranged on the turntable to rotate therewith, said means consisting of a removable unit including a base and an elongated finger, said base being provided with an opening to receive said spindle and being configured to fit within said depressed portion of the turntable, said finger projecting contiguously from said base and extending substantially at right angles to the latter and having a length exceeding the full thickness of the stack of records and disposed eccentrically with respect to the opening in said base, the eccentric position of said finger corresponding to the eccentric position of the apertures in said inserts so that, as each record is dropped along the spindle and toward the turntable, said finger finds and engages one of said eccentrically disposed apertures in the insert of each record to drive the records conjointly as they stack up in playing position on the turntable.

GILBERT J. KENNEDY.

REFERENCES CITED

The following references are of record in the file of this patent:

UNITED STATES PATENTS

| Number | Name | Date |
|---|---|---|
| 832,403 | Milans | Oct. 2, 1906 |
| 1,946,599 | Tichenor | Feb. 13, 1934 |
| 2,078,113 | Zecha | Apr. 20, 1937 |
| 2,230,003 | Mitchell | Jan. 28, 1941 |
| 2,286,015 | Schneider | June 9, 1942 |
| 2,295,938 | Dech | Sept. 15, 1942 |